(12) United States Patent
McCracken

(10) Patent No.: US 9,874,902 B2
(45) Date of Patent: Jan. 23, 2018

(54) MOBILE DEVICE DOCKING STATION

(71) Applicant: BPM Products, LLC, San Clemente, CA (US)

(72) Inventor: Brian McCracken, San Clemente, CA (US)

(73) Assignee: BPM Products, LLC, San Clemente, CA (US)

( * ) Notice: Subject to any disclaimer, the term of this patent is extended or adjusted under 35 U.S.C. 154(b) by 0 days.

(21) Appl. No.: 15/063,810

(22) Filed: Mar. 8, 2016

(65) Prior Publication Data
US 2016/0266609 A1    Sep. 15, 2016

Related U.S. Application Data

(60) Provisional application No. 62/130,607, filed on Mar. 10, 2015.

(51) Int. Cl.
G06F 1/16           (2006.01)

(52) U.S. Cl.
CPC .......... *G06F 1/1632* (2013.01); *G06F 1/1626* (2013.01); *H04R 2201/02* (2013.01)

(58) Field of Classification Search
CPC .................................................... G06F 1/1632
See application file for complete search history.

(56) References Cited

U.S. PATENT DOCUMENTS

| 5,230,016 | A | * | 7/1993 | Yasuda | H02J 7/0044 |
| | | | | | 379/426 |
| 5,248,264 | A | * | 9/1993 | Long | E05C 1/10 |
| | | | | | 439/347 |
| 5,627,727 | A | * | 5/1997 | Aguilera | G06F 1/1626 |
| | | | | | 361/679.43 |
| 6,049,192 | A | * | 4/2000 | Kfoury | H02J 7/0044 |
| | | | | | 320/113 |
| 6,193,546 | B1 | * | 2/2001 | Sadler | A45F 5/02 |
| | | | | | 439/165 |
| 6,994,575 | B1 | * | 2/2006 | Clark | B60R 11/0241 |
| | | | | | 439/173 |
| 7,014,486 | B1 | * | 3/2006 | Wu | G06F 1/1632 |
| | | | | | 439/165 |
| 7,066,752 | B2 | * | 6/2006 | Hsu | H01R 13/62905 |
| | | | | | 439/248 |
| 7,580,255 | B2 | * | 8/2009 | Crooijmans | G06F 1/1632 |
| | | | | | 361/679.41 |
| 7,719,830 | B2 | * | 5/2010 | Howarth | G06F 1/1632 |
| | | | | | 312/223.2 |
| 7,738,247 | B2 | * | 6/2010 | Choi | H02J 7/0044 |
| | | | | | 361/679.43 |

(Continued)

*Primary Examiner* — Anthony Q Edwards
(74) *Attorney, Agent, or Firm* — Dovas Law, P.C.

(57) ABSTRACT

A mobile computing device docking station is provided. The device includes an open enclosure comprising a curved inner surface. A first wall forms a first portion of the open enclosure. A second wall forms a second portion of the open enclosure, the second wall is opposite the first wall, and the first wall extends higher in a direction of an opening of the open enclosure than the second wall. A protrusion extends from the curved inner surface between the first wall and the second wall. Further provided is a combination mobile computing device and docking station and a method of projecting sound emitted by a mobile computing device.

21 Claims, 4 Drawing Sheets

(56) References Cited

U.S. PATENT DOCUMENTS

| | | | | |
|---|---|---|---|---|
| 8,083,195 B2* | 12/2011 | Osada | .................... | F16M 13/00 |
| | | | | 248/176.1 |
| 8,145,821 B2* | 3/2012 | Mead | .................... | G06F 1/1632 |
| | | | | 361/679.41 |
| D687,437 S * | 8/2013 | Hagenauer | .................... | D14/434 |
| 8,528,690 B1* | 9/2013 | Wu | ...................... | G10K 11/025 |
| | | | | 181/152 |
| 8,634,883 B2* | 1/2014 | Hong | .................... | H01R 13/60 |
| | | | | 455/575.1 |
| 8,721,356 B2* | 5/2014 | Webb | .................... | G06F 1/1632 |
| | | | | 439/248 |
| D718,761 S * | 12/2014 | Minocha | ....................... | D14/253 |
| D736,210 S * | 8/2015 | Paradise | ..................... | D14/434 |
| D751,561 S * | 3/2016 | Guthrie | ........................ | D14/434 |
| 9,509,087 B2* | 11/2016 | Hong | .................... | H01R 13/60 |
| 9,612,616 B2* | 4/2017 | Tarnoff | ................. | G06F 1/1626 |
| 2003/0148740 A1* | 8/2003 | Yau | ......................... | H04M 1/04 |
| | | | | 455/575.1 |
| 2008/0219488 A1* | 9/2008 | Crooijmans | .......... | G06F 1/1632 |
| | | | | 381/333 |
| 2009/0045234 A1* | 2/2009 | Carnevali | ............... | H04M 1/04 |
| | | | | 224/199 |
| 2010/0102777 A1* | 4/2010 | Sa | ......................... | H02J 7/0044 |
| | | | | 320/115 |
| 2011/0134601 A1* | 6/2011 | Sa | ......................... | G06F 1/1632 |
| | | | | 361/679.43 |
| 2014/0106609 A1* | 4/2014 | Strauser | ................ | G06F 1/1632 |
| | | | | 439/533 |
| 2015/0362953 A1* | 12/2015 | Shindo | ................. | H02J 7/0044 |
| | | | | 361/679.41 |

* cited by examiner

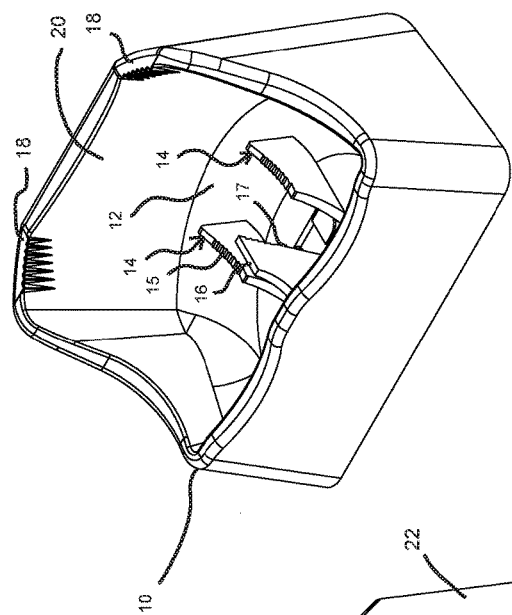
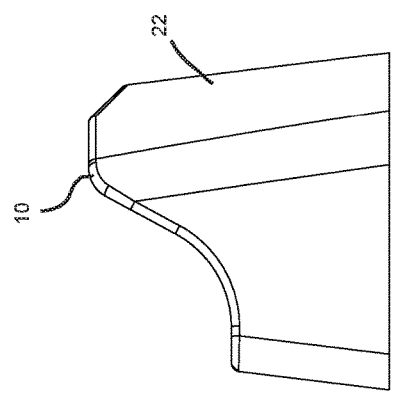
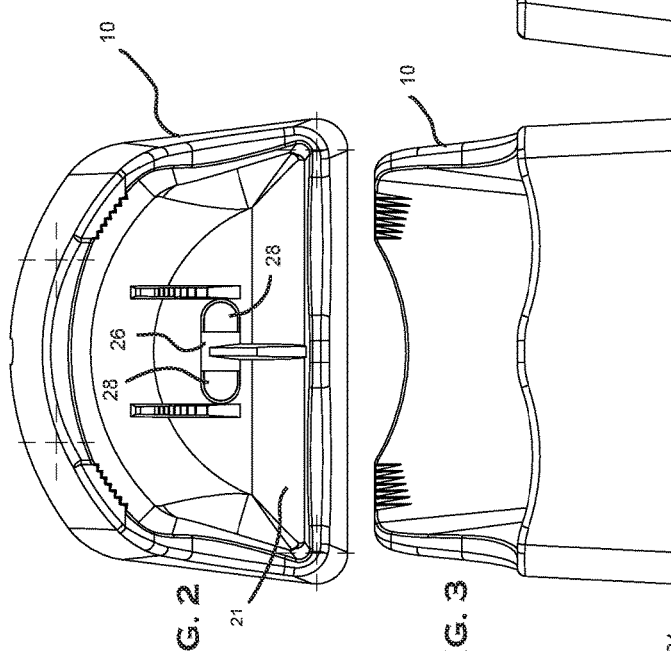
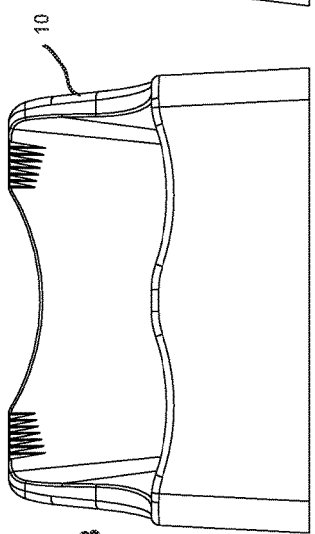
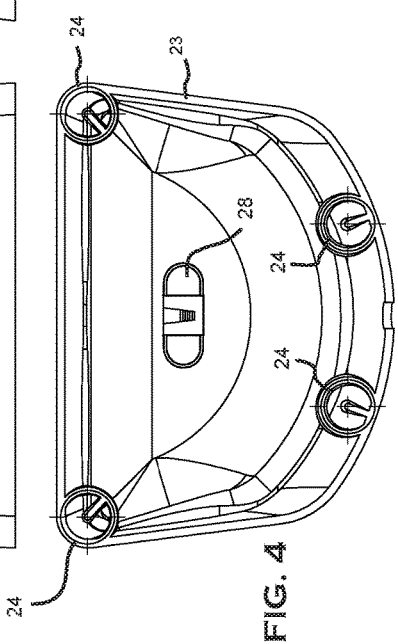

MOBILE DEVICE DOCKING STATION

CROSS REFERENCE TO RELATED APPLICATION(S)

This application claims the benefit of U.S. Provisional Application No. 62/130,607, filed Mar. 10, 2015, which is incorporated by reference as if fully set forth.

BACKGROUND

Mobile computing devices including smartphones and digital audio players include powerful multimedia capabilities. One popular use for such devices is for organizing and playing audio recordings. Since audio loudspeakers included with these devices tend to be small, like the devices themselves, the sound output is limited and often inadequate.

This inadequacy of built-in speakers leads users to attach headphones to a mobile device's headphone jack to listen to audio. Headphones are limiting in that it is difficult for more than one person to listen to audio from a single set of headphones. Moreover, headphones can prevent users from hearing other environmental sounds and conversing with other people. Headphones are often regarded as anti-social when used around others.

A traditional docking station is a desktop accessory that provides a place to set a mobile device when it is not being used and/or the owner of the device is not mobile. Most docking stations have an AC connection built in and will charge the device while it is set in the docking station. Such docking stations are not typically designed to allow unhindered device use when a mobile device is in the docking station. However, some docking stations have speakers built into them to amplify audio from a mobile device.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A mobile computing device docking station is provided. The device includes an open enclosure comprising a curved inner surface. A first wall forms a first portion of the open enclosure. A second wall forms a second portion of the open enclosure, the second wall is opposite the first wall, and the first wall extends higher in a direction of an opening of the open enclosure than the second wall. One or more protrusions extend from the curved inner surface between the first wall and the second wall.

Further provided is a combination mobile computing device and docking station. The combination includes a docking station including a body configured for freestanding on a flat surface, a curved surface in the body forming an open enclosure, and a mounting surface elevated relative to the curved surface. The combination further includes a mobile computing device including a user interface display and including a loudspeaker generally positioned at a first end of the mobile computing device. The mobile computing device is removably positioned within the open enclosure and extends through the open enclosure with the first end of the mobile device in contact with the mounting surface and the loudspeaker substantially unobstructed by the mounting surface and distanced from the curved surface.

Further provided is a method of projecting sound emitted by a mobile computing device. The method includes providing an open ended docking station including a concave surface and a mounting surface elevated relative to the concave surface. A mobile computing device is provided including a user interface display and including a loudspeaker positioned generally at a first end of the mobile computing device. An audio output of the mobile computing device is activated, and the mobile computing device is positioned into the open ended docking station with the first end of the mobile computing device in contact with the mounting surface with the loudspeaker mostly unobstructed by the mounting surface and distanced from the concave surface.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 1 is a perspective view of a mobile device docking station.

FIG. 2 is a top plan view of the mobile device docking station of FIG. 1.

FIG. 3 is a front elevation view of the mobile device docking station of FIG. 1.

FIG. 4 is a bottom plan view of the mobile device docking station of FIG. 1.

FIG. 5 is a side elevation view of the mobile device docking station of FIG. 1.

DETAILED DESCRIPTION OF ILLUSTRATIVE EMBODIMENT(S)

Figure 6:
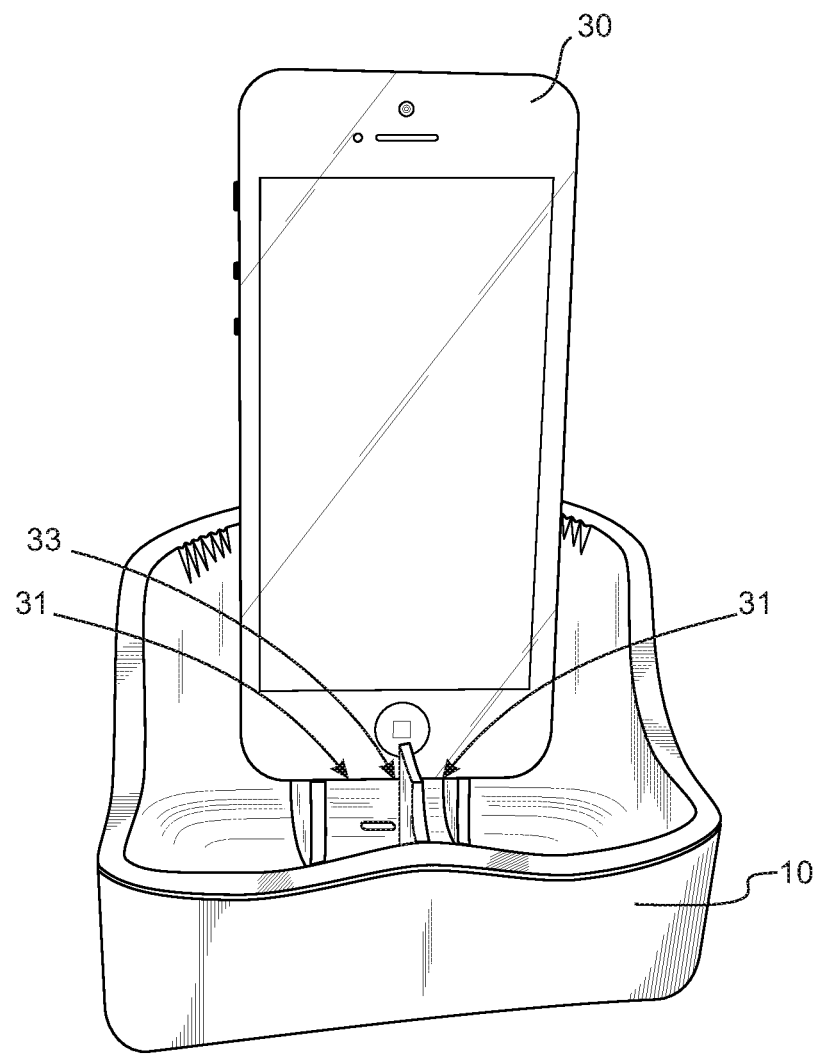
FIG. 6 is a front perspective view of the docking station of FIG. 1 with a mobile device positioned therein.

Referring to FIGS. 1-5, a mobile computing device docking station 10 is shown that without any electrical power projects and amplifies sound coming from a mobile device's speakers while the mobile device is set in the docking station 10. Mobile computing devices ("mobile devices") as described herein can include cell phones, smartphones, digital audio players, or any compact electronic device including one or more loudspeakers and capable of playing a recorded, broadcasted, or streamed sound.

The docking station 10 forms an open ended curved enclosure 12 (a "dish") configured to hold mobile devices of various sizes and types, with loudspeakers on the bottom, the sides, or the top of the device. The dish 12 as shown includes an irregular concave surface forming a large opening at the top of the docking station as shown. A mobile device can be positioned in the docking station 10 through the opening, leaning slightly backwards, with its bottom held in position and the back of the device resting against the back wall 20 of the station. Beneficially, the end of the mobile device closest to the speaker(s) is positioned first into the docking station 10 and onto ridged surfaces 15 of protrusions 14. A front bracket 16 and rear grips 18 help stabilize an installed mobile device. The front bracket 16 protrudes from a sloping front wall 21 and includes a ridged surface 17 spaced from the front wall 21 for maintaining the bottom of a mobile device positioned in the docking station at a suitable distance from the front wall 21.

The docking station 10 is beneficially formed of a polymeric material produced from one or more thermoplastic or thermosetting resins, including for example ABS, polystyrene, polyvinylchloride, polycarbonate and acrylic. Alternatively, one or more other materials such as wood or metal may be used in the production of the docking station 10. The docking station 10 can be injection molded, vacuum formed, fuse deposition modeled, machined, fabricated, or produced by other suitable manufacturing process or plurality of processes.

FIG. 6 shows an exemplary mobile device 30 positioned in the docking station 10. The mobile device 30 includes loudspeakers 31 and a power/data cable port 33 positioned at a bottom surface of the mobile device 30. Alternatively, the mobile device 30 can be provided with loudspeakers or a power/data cable port elsewhere on the mobile device 30, for example on a side, back, or front of the mobile device, but beneficially the loudspeakers and power/data cable port are generally positioned at the end of the mobile device which is positioned on the protrusions 14. The docking station 10 holds a mobile device such as the mobile device 30 in place just above the bottom of the dish 12 and spaced from the back wall 20 and front wall 21, allowing for the sound waves to flow unimpeded from the device's speakers into, around, and then out of the dish 12. So long as the loudspeakers are in reasonable proximity to the dish 12, the sound waves are projected forward toward the user/listener of the device. The result is sound that is louder, richer, and more focused than would result from a mobile device used on its own.

Figure 7:
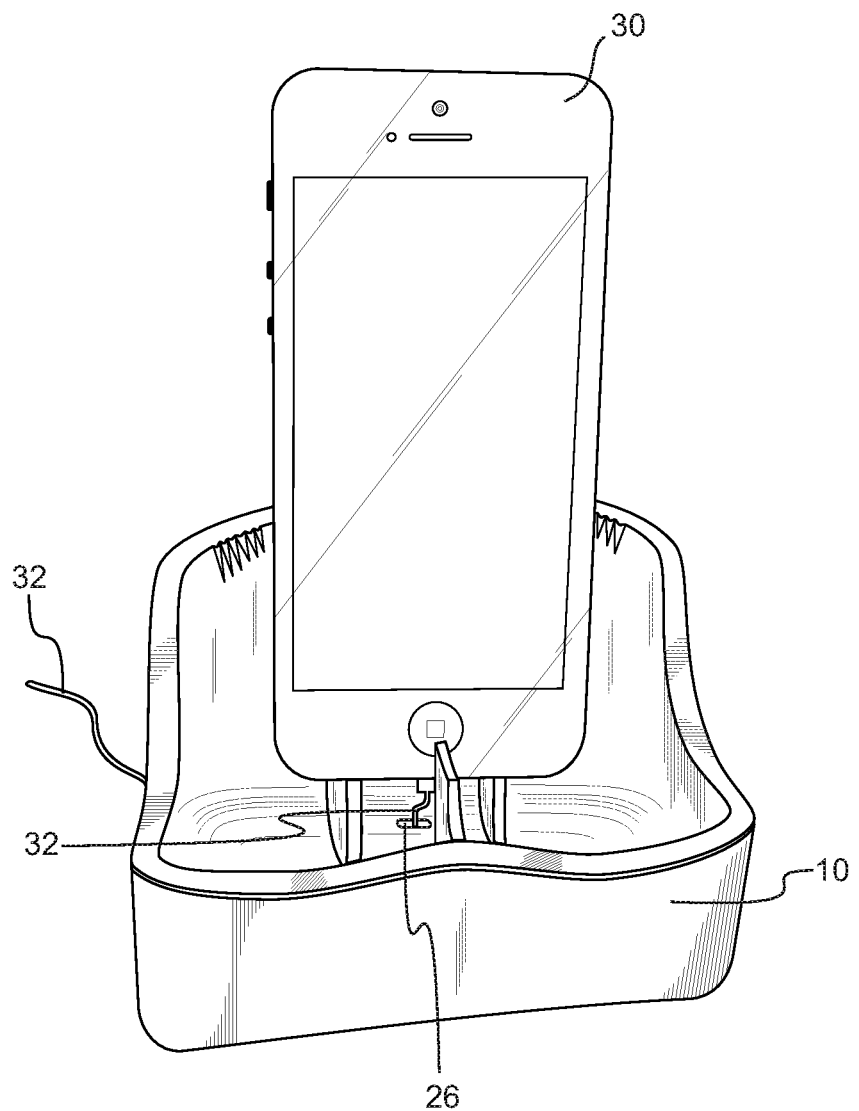
FIG. 7 is a front perspective view of the docking station of FIG. 1 with a mobile device positioned therein and a power/data cable connected to the mobile device.

In addition to the acoustic benefits of the docking station 10, the docking station 10 provides an ergonomic solution for holding a mobile device. The docking station 10 takes up little space, and holds a mobile device in an easy-to-view position and at a good angle for operating a touch screen of the mobile device. The shape of the back wall 20, the forward draft of the back exterior wall 22, and the four elastomeric (e.g., "rubber") contacts (hereinafter "bump-ons 24") positioned on a base portion 23 on the bottom of the docking station 10 hold a mobile device steady and prevent it from tipping over when a user taps the screen of the device. The bump-ons 24 also provide sound and vibration isolation with respect to a surface on which the docking station 10 is placed. An aperture 26 in the center-bottom of the docking station 10 permits a power cord to be inserted from the bottom and connected to a device while it is docked. Punch outs 28 allow for use of larger power cords or power cords with larger end connectors. Pushing through and removing the punch outs 28 allows for creation of a larger aperture 26. FIG. 7 shows the exemplary mobile device 30 positioned in the docking station 10 with a power/data cable 32 connected to the mobile device through the aperture 26.

The docking station 10 as shown and described is adept at holding a mobile device in an ergonomic position and in a convenient location such as on a desktop. The docking station 10 is an effective acoustic amplifier for music or other sound being played on a mobile device, making the sound coming from the device louder without any power or electrical connection. The shape of the docking station's interior is configured to reflect and project sound waves emitted from a device's speakers toward the listener providing sound richer and louder and allowing the sound to fill a larger space. The combination of the curvature of the main cavity, the contours of the inner walls, and the overall acoustically projecting shape makes the docking station 10 effective for such purpose. The shape, size, and design of the docking station 10 and particularly the protrusions 14, 16 and back wall 20 allow for almost any typically-sized mobile device and any speaker design or location on the mobile device.

Figure 8:
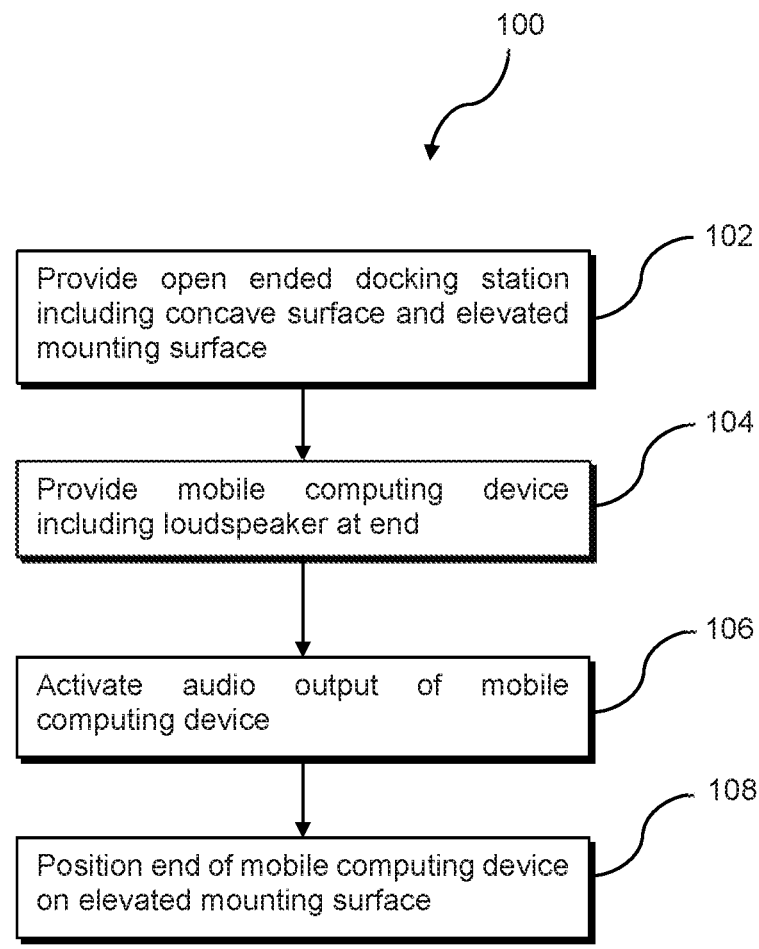
FIG. 8 is a flowchart showing a method of projecting sound emitted by a mobile device.

Referring to FIG. 8, a method 100 of projecting sound emitted by a mobile computing device is provided. The method 100 includes providing an open ended docking station including a concave surface and a mounting surface elevated relative to the concave surface (step 102). A mobile computing device is provided including a user interface display and including a loudspeaker positioned at a first end of the mobile computing device (step 104). An audio output of the mobile computing device is activated (step 106), wherein activating the audio can include for example playing video content or audio content. Further, the mobile computing device is positioned into the open ended docking station with the first end of the mobile computing device in contact with the mounting surface and with the loudspeaker mostly unobstructed by the mounting surface and distanced from the concave surface (step 108).

Although features and elements are described above in particular combinations, one of ordinary skill in the art will appreciate that each feature or element can be used alone or in any combination with the other features and elements. While embodiments have been described in detail above, these embodiments are non-limiting and should be considered as merely exemplary. Modifications and extensions may be developed, and all such modifications are deemed to be within the scope defined by the appended claims.

What is claimed is:

1. A mobile computing device docking station comprising:
    an open enclosure comprising a curved inner surface;
    a first wall forming a first portion of the open enclosure;
    a second wall forming a second portion of the open enclosure, the second wall opposite the first wall, and the first wall extending higher in a direction of an opening of the open enclosure than the second wall; and
    at least one protrusion extending from the curved inner surface between the first wall and the second wall, the at least one protrusion comprising:
        a first surface substantially spaced from the second wall and the first wall and substantially facing the first wall; and
        at least one elongated top surface comprising a second surface elongated and substantially spaced from the curved inner surface.

2. The mobile computing device docking station of claim 1, further comprising a base portion, the at least one protrusion comprising at least a first protrusion comprising the first surface, a second protrusion comprising the second surface, and a third protrusion, the second protrusion and the third protrusion being of substantially the same height, the first protrusion extending toward an open end of the open enclosure and higher relative to the base portion than the second and third protrusions, the second protrusion and the third protrusion substantially disposed between the first wall and the first protrusion, wherein the at least one elongated top surface further comprises a third surface on the third protrusion, the third surface elongated and spaced from the curved inner surface substantially the same distance as the second surface.

3. The mobile computing device docking station of claim 2, further comprising an aperture running between the second protrusion and the third protrusion through the curved inner surface and the base portion.

4. The mobile computing device docking station of claim 1, the at least one protrusion extending from the curved inner surface between the first wall and the second wall.

5. A mobile computing device docking station comprising:
an open enclosure comprising a curved inner surface;
a first wall forming a first portion of the open enclosure;
a second wall forming a second portion of the open enclosure, the second wall opposite the first wall, and the first wall extending higher in a direction of an open end of the open enclosure than the second wall; and
at least one protrusion extending from the curved inner surface between the first wall and the second wall; and
a base portion, the at least one protrusion comprising a first surface opposite the first wall and spaced from the second wall and a second surface angled with respect to the first surface and substantially positioned between the first surface and the first wall, the first surface extending higher relative to the base portion, toward the open end of the open enclosure, than the second surface.

6. The mobile computing device docking station of claim 5, at least one of the first surface and the second surface comprising a ridged surface.

7. The mobile computing device docking station of claim 5, the at least one protrusion comprising a first protrusion and a second protrusion, the first surface being on the first protrusion and the second surface being on the second protrusion.

8. The mobile computing device docking station of claim 5, the at least one protrusion further comprising a third surface substantially coplanar with the second surface and substantially positioned between the first surface and the first wall.

9. The mobile computing device docking station of claim 1, the curved inner surface comprising a concave surface.

10. The mobile computing device docking station of claim 1, further comprising an aperture running through the curved inner surface.

11. The mobile computing device docking station of claim 1, further comprising a punch out running through the curved inner surface for creating an aperture through the curved inner surface.

12. The mobile computing device docking station of claim 1, the first wall, the second wall, and the at least one protrusion comprising a polymeric material.

13. The mobile computing device docking station of claim 1, further comprising a base portion comprising a plurality of elastomeric contacts.

14. The mobile computing device docking station of claim 1, further comprising a ridged surface on a top edge of the first wall.

15. A combination mobile computing device and docking station comprising:
a docking station comprising:
a body configured for freestanding on a flat surface;
at least one curved surface in the body forming an open enclosure;
a first wall forming a first portion of the open enclosure;
a second wall forming a second portion of the open enclosure, the second wall opposite the first wall, and the first wall extending higher in a direction of an opening of the open enclosure than the second wall; and
at least one mounting surface elevated relative to the curved surface; and
a mobile computing device comprising a user interface display and at least one loudspeaker positioned generally at a first end of the mobile computing device;
the mobile computing device removably positioned within the open enclosure and extending through the open enclosure with the first end of the mobile computing device resting on the at least one mounting surface substantially distanced from the curved surface, substantially distanced from the first wall, and substantially distanced from the second wall, and the at least one loudspeaker substantially unobstructed by the at least one mounting surface and substantially distanced from the curved surface, substantially distanced from the first wall, and substantially distanced from the second wall.

16. The combination mobile computing device and docking station of claim 15,
a surface of the mobile computing device opposite the user interface display resting on the first wall, and the user interface display being substantially unobstructed by the second wall.

17. The combination mobile computing device and docking station of claim 16,
the docking station further comprising at least one protrusion comprising a first surface opposite the first wall and spaced from the first wall and the second wall;
the mounting surface comprising a second surface angled with respect to the first surface and substantially positioned between the first surface and the first wall, the first surface extending higher in a direction of the opening of the open enclosure than the second surface; and
the mobile computing device removably positioned with the first end of the mobile computing device further in contact with the first surface of the at least one protrusion.

18. A method of projecting sound emitted by a mobile computing device, the method comprising:
providing an open ended docking station comprising:
a concave surface forming a cup comprising a first wall and a second wall opposite the first wall, the first wall extending higher in a direction of an open end of the docking station than the second wall; and
at least one mounting surface elevated relative to the concave surface;
providing a mobile computing device comprising a user interface display and at least one loudspeaker generally positioned at a first end of the mobile computing device;
activating an audio output of the mobile computing device; and
positioning the mobile computing device into the open ended docking station with the first end of the mobile computing device resting on the at least one mounting surface and substantially distanced from the concave surface, substantially distanced from the first wall, and substantially distanced from the second wall and the at least one loudspeaker mostly unobstructed by the at least one mounting surface and substantially distanced from the concave surface, substantially distanced from the first wall, and substantially distanced from the second wall.

19. The method of claim 18, wherein activating the audio output comprises playing at least one of video content and audio content.

20. The method of claim 18, further comprising:
providing a power/data cable;
providing the docking station with an aperture through the concave surface; and
running the power/data cable through the aperture and into a mating portion of the mobile computing device.

21. The method of claim 18, further comprising:
providing a power/data cable;
providing the docking station with punch outs through the concave surface;
pushing through the punch outs to create an aperture; and
running the power/data cable through the aperture and into a mating portion of the mobile computing device.

* * * * *